United States Patent

Murata et al.

[11] Patent Number: 5,875,037
[45] Date of Patent: *Feb. 23, 1999

[54] COMMUNICATION APPARATUS

[75] Inventors: Yukio Murata; Naoto Kagami, both of Yokohama; Hidetoshi Tanno, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 538,035

[22] Filed: Oct. 2, 1995

Related U.S. Application Data

[63] Continuation of Ser. No. 114,345, Sep. 1, 1993, abandoned.

[30] Foreign Application Priority Data

Sep. 3, 1992 [JP] Japan .................... 4-235931
Sep. 3, 1992 [JP] Japan .................... 8-235936

[51] Int. Cl.[6] ............................................ H04N 1/00
[52] U.S. Cl. .................... 358/400; 358/425; 358/442; 358/468
[58] Field of Search .................... 358/400, 425, 358/434, 435, 436, 437, 438, 439, 442, 468; 379/100; 370/94.1, 110.1

[56] References Cited

U.S. PATENT DOCUMENTS

| | | | |
|---|---|---|---|
| 4,746,986 | 5/1988 | Tanigawa | 358/442 |
| 5,034,948 | 7/1991 | Mizutani et al. | 370/110.1 |
| 5,127,046 | 6/1992 | Malm | 379/93.05 |
| 5,142,568 | 8/1992 | Ogata et al. | 379/100 |
| 5,204,949 | 4/1993 | Yasue et al. | 370/112 |
| 5,218,680 | 6/1993 | Farrell et al. | 370/94.1 |

*Primary Examiner*—Thomas D. Lee
*Attorney, Agent, or Firm*—Fitzpatrick, Cella, Harper & Scinto

[57] ABSTRACT

A communication apparatus which is connected to an ISDN includes a data input/output (I/O) unit for inputting/outputting data and an ISDN interface to control the data input/output operations between the data I/O unit and the ISDN. The ISDN interface is constructed on a one-chip IC and at least includes an interface for separating B-channel data and D-channel data and for inputting/outputting the data, a switch for switching data paths in accordance with the classification of the information of the B-channel data and a modem which is connected to the path for 3.1K audio in the path of the B-channel data. The ISDN interface further has a speed matching processing circuit for matching the speed of the data which is inputted/outputted to/from the data I/O unit with the speed of 64k non-limit digital data. A commercial power source is supervised and the occurrence of a power failure is detected by a detecting unit. In case of a power failure, a power supply mode is switched from a commercial power source to a power supply from the line and the power source is supplied to the ISDN I/F unit and the one-chip microcomputer.

32 Claims, 15 Drawing Sheets

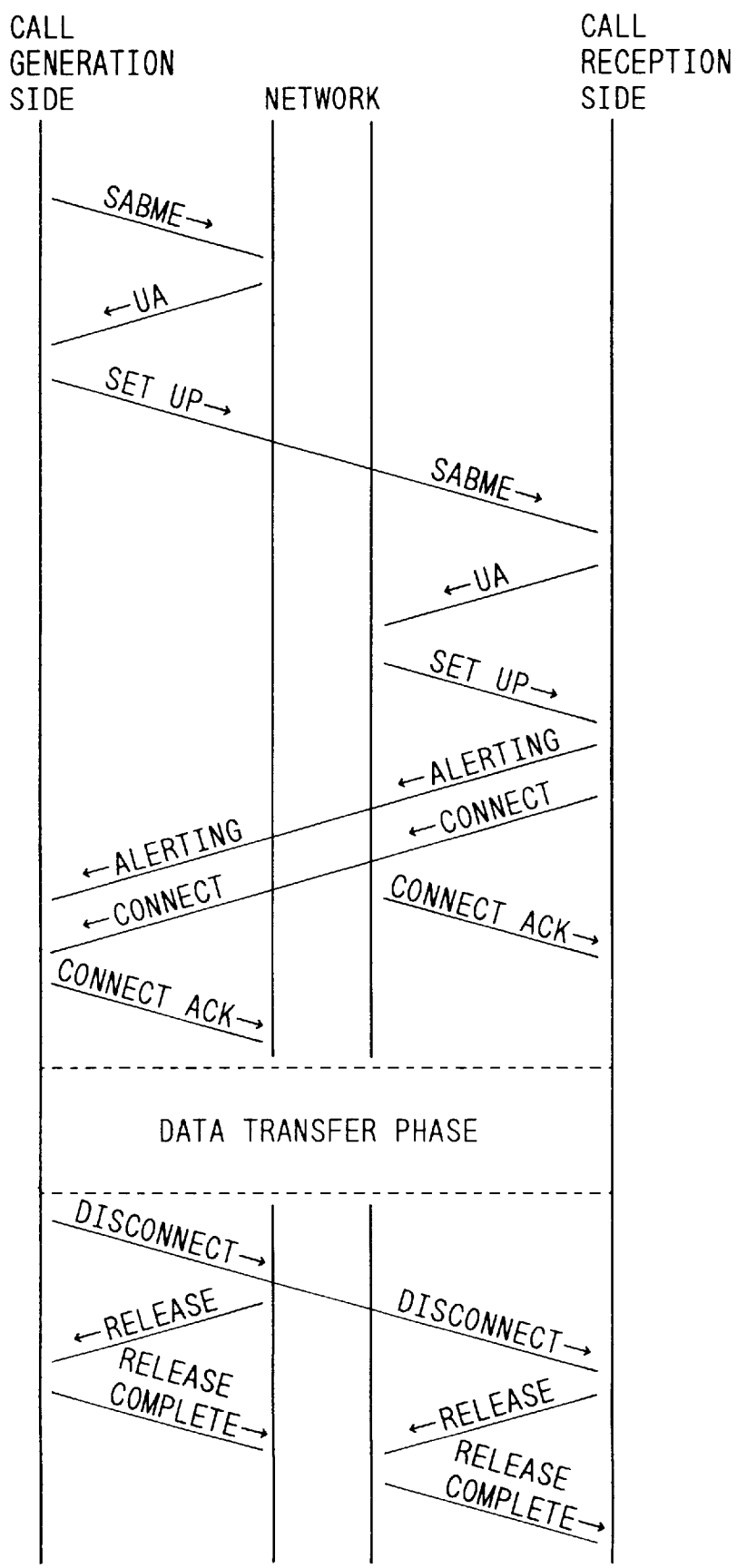

FIG. 3

CALL SETTING MESSAGE (SET UP MESSAGE)

| INFORMATION CONTENTS | CLASSIFICATION | INFORMATION LENGTH |
|---|---|---|
| PROTOCOL IDENTIFIER | ESSENTIALS | 1 |
| CALL NUMBER | ESSENTIALS | 2~3 |
| MESSAGE CLASSIFICATION | ESSENTIALS | 1 |
| TRANSMISSION ABILITY | ESSENTIALS | 4~13 |
| CHANNEL IDENTIFIER | OPTION | 2~ |
| FACILITY | OPTION | 2~ |
| PROGRESS IDENTIFIER | OPTION | 2~4 |
| DISPLAY | OPTION | 2~34 |
| KEY PAD FACILITY | OPTION | 2~34 |
| SIGNAL | OPTION | 2~3 |
| FEATURE ACTIVATION | OPTION | 2~4 |
| FEATURE INDICATION | OPTION | 2~5 |
| GENERATION NUMBER | OPTION | 2~36 |
| GENERATION SUB ADDRESS | OPTION | 2~23 |
| RECEPTION NUMBER | OPTION | 2~35 |
| RECEPTION SUB ADDRESS | OPTION | 2~23 |
| TRANSIT NETWORK SELECTION | OPTION | 2~ |
| LOW-ORDER LAYER MATCHING | OPTION | 2~16 |
| HIGH-ORDER LAYER MATCHING | OPTION | 2~4 |
| USER·USER | OPTION | 2~131 |

FIG. 4

TRANSMISSION ABILITY OCTET

| BIT | 5 | 4 | 3 | 2 | 1 | 0 | INFORMATION TRANSFER ABILITY |
|---|---|---|---|---|---|---|---|
| | 0 | 0 | 0 | 0 | 0 | 0 | AUDIO |
| | 0 | 1 | 0 | 0 | 0 | 0 | 64k NON-LIMITED DIGITAL |
| | 0 | 1 | 0 | 0 | 0 | 1 | RESERVE |
| | 1 | 0 | 0 | 0 | 0 | 0 | 3.1kHz AUDIO |
| | 1 | 0 | 0 | 0 | 0 | 1 | RESERVE |
| | 1 | 1 | 0 | 0 | 0 | 0 | RESERVE |

COMMUNICATION APPARATUS

This application is a continuation of application Ser. No. 08/114,345 filed Sep. 1, 1993, which is now abandoned.

BACKGROUND OF THE INVENTION

1. Field of the Invention

The invention relates to a communication apparatus such as a facsimile apparatus or the like which is connected to an ISDN.

2. Related Background Art

A facsimile apparatus is widespread in the society and is an apparatus which is indispensable as a business tool. On the other hand, in the communication line, the services of the ISDN (Integrated Service Digital Network) are just beginning, the integration of the communication is progressing, and the facsimile apparatus is expected as to be an infrastructure of the next generation of communication apparatus.

In the ISDN, it is possible to inter-network connect with the conventional PSTN (Public Service Telephone Network). Therefore, most of the ISDN facsimile apparatuses which are connected to the ISDN have the ability to communicate with both of the G4 facsimile apparatus which is connected to the ISDN and the G3 facsimile apparatus which is connected to the PSTN. Consequently, in the ISDN facsimile apparatus, the number of necessary parts such as ISDN interface, MODEM for the G3 facsimile apparatus, PCM-CODEC, HDLC controller, and the like is much greater than that of the G3 facsimile apparatus. Thus, there are problems such that a scale and cost of the hardware are much greater than those of the G3 facsimile apparatus. It is, accordingly, a present situation that the cost of the apparatus is high and, in spite of the fact that there are many advantages of the ISDN line such as high-speed communication, multiaccess, and the like, the G4 facsimile apparatus is not used in place of the G3 facsimile apparatus.

In a telephone using the PSTN, even in case of a power failure, the dialing function, ringing function, and off-hook detecting function are made operative by merely supplying a power source from the network and the telephone can be used. Therefore, even in case of the power failure, emergency information or the like can be also transmitted. In a communication terminal using the ISDN, particularly, in the terminal having the facsimile function, however, in order to make the telephone operative, a number of circuits such as control unit, communication control unit, and the like must be made operative in terms of the construction and an electric power consumption of the circuit cannot be satisfied merely from the power supply of the network. Even when a backup power source is used, the power source can be held for only a short time. The cost is also high. In case of a power failure, consequently, the telephone attached to the ISDN terminal cannot be used.

SUMMARY OF THE INVENTION

It is an object of the invention to provide a communication apparatus which can reduce the cost of the apparatus of an ISDN communication apparatus, particularly, a communication terminal having a facsimile function as mentioned above and which can reduce the apparatus cost to a costs near the cost of a G3 facsimile apparatus.

Another object of the invention is to provide a communication apparatus in which, by reducing the apparatus cost, the user can widely use the advantages of the ISDN communication network.

In the ISDN, two data channels are provided by the basic interface and two communications can be simultaneously executed. However, still another object of the invention is to provide a communication apparatus which can multiaccess not only the facsimile communication but also a wide range of digital communication such as communication by a personal computer, a data transfer via a floppy disk, or the like.

Still another object of the invention is to provide a communication apparatus which can make the telephone function operative merely from a power supply of the network even at the time of a power failure without using a backup power source.

To accomplish the above objects, according to the invention, there is provided a communication apparatus which is connected to the ISDN, wherein at least an ISDN interface unit being used for separating B-channel data and D-channel data and for inputting or outputting them, means for switching data paths in accordance with the classification of the information of the B-channel data and inputting or outputting, and a MODEM are formed onto one chip, so that the number of parts which are required in the ISDN communication terminal can be reduced, a scale of hardware can be fairly reduced, and the cost can be also decreased.

In the path of the B channel, by possessing the paths for 64k non-limit digital data for two channels, a number of kinds of digital communications can be realized by the multiaccess.

Further, means for selecting a proper one of the separated data paths in accordance with the classification of the information of the B-channel data, means for performing an HDLC control of the selected B-channel data path, and a serial or parallel communication interface which is connected to the means for performing the HDLC control and to a D-channel data input/output section of the ISDN interface unit are built in the apparatus, thereby enabling a personal computer, a work station, or the like to be easily connected to the ISDN line. Therefore, a stand-alone terminal can be developed to a multiaccess terminal of the multimedia ISDN line with low cost and with a small installation area.

According to the invention, in a communication apparatus which is connected to the ISDN, at least an ISDN interface unit for inputting or outputting a bus in which B-channel data and D-channel data have been multiplexed and a MODEM are formed on one chip. In the chip, the power supply is separated from the power supply of the ISDN interface unit and the power supply to the other portions. In case of a power failure. Using a power source is supplied to the ISDN interface unit from the line by means for supervising a commercial power supply and detecting a power failure and a power supervisory circuit to switch the power supply from the commercial power supply to the power supply from the line at the time of a power failure. By using the above means, the electric power consumption which is necessary for the telephone function can be reduced and a speech communication can be performed by merely a station power supply from the line. On the other hand, a one-chip microcomputer for mainly controlling the layer 2.3 in case of power failure is also built in the chip, so that the number of parts can be reduced, a scale of hardware can be extremely reduced, and the costs can be also decreased.

The above and other objects and features of the present invention will become apparent from the following detailed description and the appended claims with reference to the accompanying drawings.

BRIEF DESCRIPTION OF THE DRAWINGS

FIG. 2 is a flowchart showing a procedure for a call setting and a call release;

FIG. 3 is a diagram showing call setting messages;

FIG. 4 is a diagram showing transfer ability information elements in the call setting messages;

DETAILED DESCRIPTION OF THE PREFERRED EMBODIMENTS (First embodiment)

The first embodiment of the invention will be described in detail hereinbelow with reference to the drawings.

Figure 1:
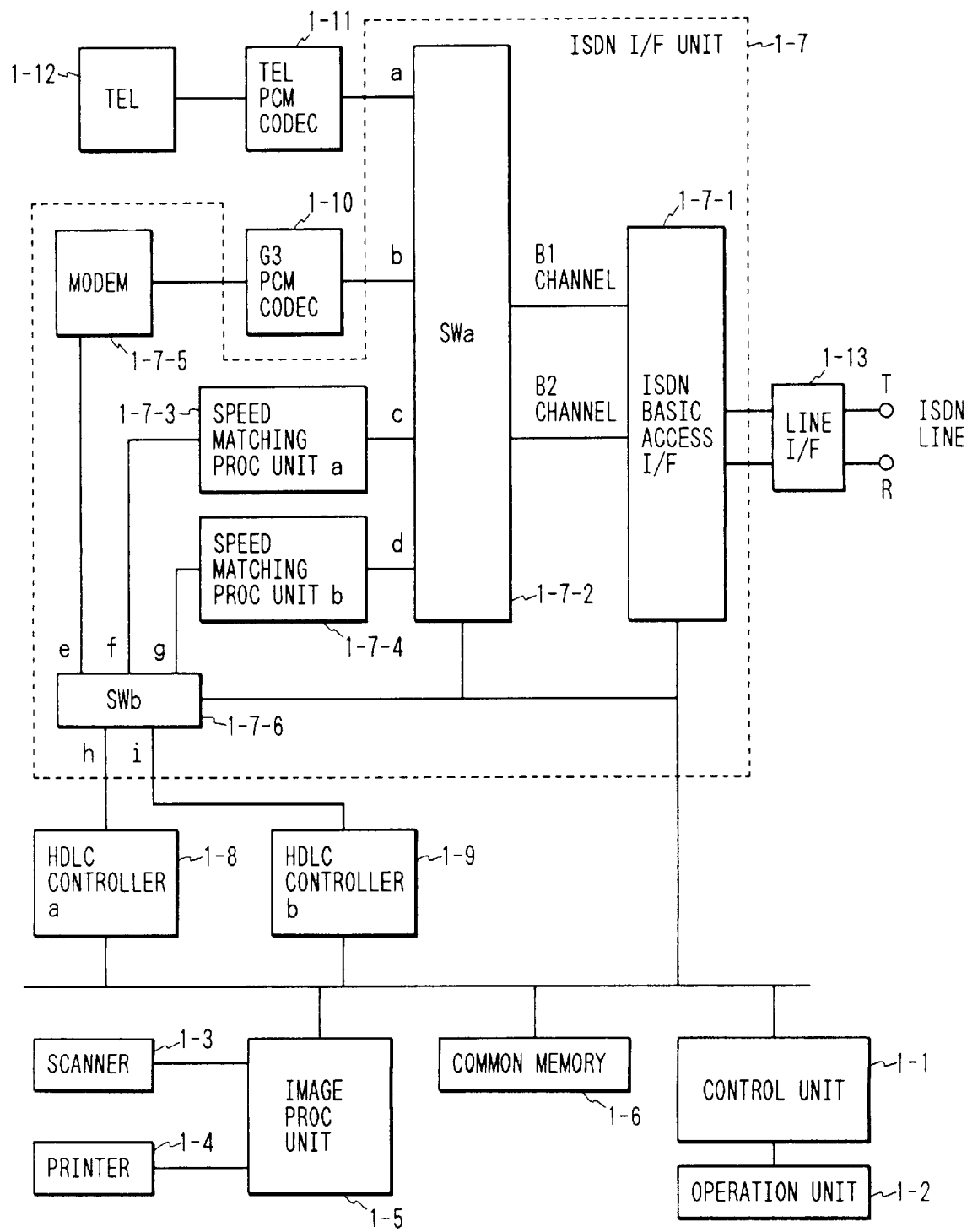
FIG. 1 is a block diagram showing a construction of a communication apparatus of a first embodiment of the invention.

An outline of a construction of a facsimile apparatus will be first explained with reference to the block diagram of FIG. 1.

Reference numeral 1-1 denotes a control unit such as a microcomputer circuit made up of a CPU, a ROM, an RAM, a clock IC, an I/O, a CGROM, and the like. The control unit 1 executes an operation control of the entire apparatus and a management of various kinds of data by a software control of the microcomputer. Reference numeral 1-2 denotes an operation unit such as a terminal which is constructed by various keys a display unit, and the like. The operation unit 1-2 accepts a key input from an operator and displays various information. Reference numeral 1-3 denotes a scanner comprising a CCD, an A/D converter, an image processor, and the like. The scanner 1-3 executes image processes such as photoelectric conversion, A/D conversion, image correction, a binarizing process, and the like to the data which was optically read. Reference numeral 1-4 denotes a printer as an image output apparatus such as thermal printer, laser beam printer, ink jet printer, or the like. The printer 1-4 generates as a visible image the image data read out by the scanner 1-3, the image data received, or the image data formed by the control unit. Reference numeral 1-5 denotes an image proc (processing) unit comprising a compression code encoding/decoding processing circuit, an image data enlarging/reducing circuit, and the like. The image proc unit 1-5 executes image processes such as encoding of the read image data, decoding of the received image data, generation of the decoded data, and the like. Reference numeral 1-6 denotes a common memory to store the read image data, received image data, and the like. Reference numeral 1-7 denotes an ISDN I/F (interface) unit comprising: an ISDN basic access I/F (interface) 1-7-1; a B-channel change-over switch SWa 1-7-2, a speed matching proc (processing) unit a 1-7-3; a speed matching proc (processing) unit b 1-7-4; a MODEM 1-7-5; and a B-channel change-over switch SWb 1-7-6. The ISDN I/F unit 1-7 which is enclosed by a broken line, is constructed on a one-chip IC. The ISDN basic access I/F unit 1-7-1 mainly controls ISDN layers 1 and 2. The B-channel change-over switch SWa 1-7-2 executes a function to switch a data path in accordance with the classification of the information of the B-channel data which is transmitted or received. There are three kinds of data; 64k non-limit digital information; 3.1K audio; and audio. The speed matching proc units a 1-7-3 and b 1-7-4 execute conversion of a data transfer rate such as conversion of 64 kbps/56 kbps or the like. The MODEM 1-7-5 executes the modulation of the data which is transmitted, the demodulation of the received data, and the like. The B-channel change-over switch SWb 1-7-6 selects two data paths from among three data paths of the MODEM 1-7-5 and the speed matching proc units a 1-7-3 and b 1-7-4 and inputs or outputs the data. An HDLC controller a 1-8 executes processes such as framing of the B-channel data which is transmitted, deframing of the received B-channel data, and the like. An HDLC controller b 1-9 executes processes such as framing of the B-channel data which is transmitted, deframing of the received B-channel data, and the like. A G3-PCM-CODEC 1-10 and a TEL-PCM-CODEC 1-11 converts the digital data into analog data upon reception and converts the analog data into digital data upon transmission on the basis of the respective characteristics (CCITT Recommendation G.711). Reference numeral 1-12 denotes a telephone circuit which is used in a telephone conversation, and 1-13 indicates a line I/F (interface) comprising a pulse transformer and the like. The B-channel data and D-channel data are transmitted or received through the line I/F 1-13.

A communication control procedure will now be described with reference to FIG. 2. FIG. 2 shows a procedure for call setting and call release using the D channel of the ISDN. In FIG. 2, when the call reception side receives SET UP and is in a receivable state, each time ALTERING-.CONNECTING is sent, the call reception side enters the receiving state and progresses to the procedure for the call release through Data Transfer Phase. FIG. 3 shows the information contents of the SET UP message. FIG. 4 shows the information transfer ability in the transfer ability information elements. Upon reception, by detecting the information transfer ability (shown in the SET UP message), the switching operations of the switches SWa 1-7-2 and SWb 1-7-6 are controlled. Upon transmission, the switching operations of the switches SWa 1-7-2 and SWb 1-7-6 are controlled in accordance with the classification of the data to be transmitted. The information transfer ability in the SET UP message is set into a stress according to the classification of the data to be transmitted and is transmitted.

Figure 5:
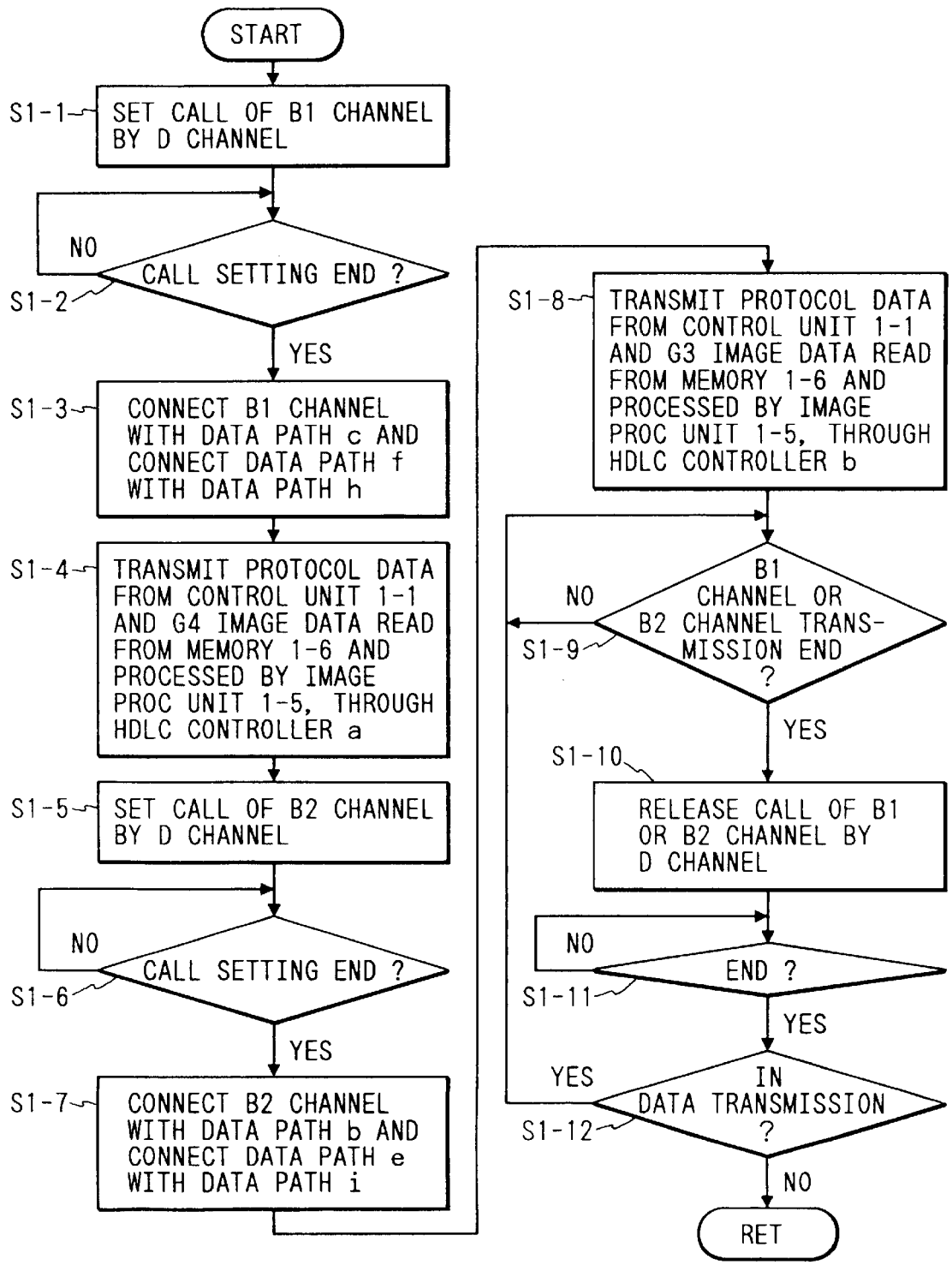
FIG. 5 is a flowchart showing the control operation of the first embodiment.

An example of the communication control will now be described with reference to the flowchart of FIG. 5. An example in case of simultaneously processing the G4 transmission and the G3 transmission will now be described here.

First, in step S1-1, a call of the B1 channel is set by the D channel for the G4 transmission. In this instance, the call is set in accordance with the procedure as shown in FIG. 2. After the call is set (S1-2), a data path of the B1-channel data is set (S1-3). In FIG. 1, the B1 channel is connected with a data path (c), and a data path (f) is connected to a data path (h). After the data paths are set, the G4 data which is sent from the common memory 1-6 is read out and the framing of the HDLC is performed by the HDLC controller a, and in the case where speed matching is necessary, the speed matching process is executed by the speed matching proc unit a, and the transmission of the data is started by the B1 channel (S1-4, Data Transfer Phase in FIG. 2).

In step S1-5, a call of the B2 channel is set by the D channel for the G3 transmission. In this instance, the call is set in accordance with the procedure as shown in FIG. 2. After the call is set (S1-6), a data path of the B2-channel data is set (S1-8). In FIG. 1, the B2 channel is connected with a data path (b), and a data path (e) is connected with a data path (i). After the data paths are set, the G3 data which is sent from the common memory 1-6 is read out, the framing of the HDLC is performed by the HDLC controller b, the data is modulated by using the MODEM 1-7-5, the modulated analog data is converted into digital data by the G3-PCM-CODEC 1-10, and transmission of the data is started by using the B2 channel (S1-9, Data Transfer Phase in FIG. 2).

After the G4 transmission or the G3 transmission is finished (S1-9), the call of the channel after the end of the transmission is released (S1-10). In this instance, the call is released in accordance with the procedure as shown in FIG. 2. After completion of the transmission of two B channels, the processing routine is finished.

According to the embodiment as mentioned above, in a communication apparatus which is connected to the ISDN, at least the ISDN I/F unit for separating the B-channel data and the D-channel data and for inputting/outputting the data, the switches for switching the data paths in accordance with the classification of the information of the B-channel data and for inputting/outputting the data, the circuit to perform the speed matching to the path for the 64k non-limit digital data in the path of the B-channel data, and the MODEM are formed on one chip. Thus, the number of parts which are essential to the ISDN communication terminal are reduced, the scale of hardware can be remarkably decreased, and the cost can be also reduced.

Although the above embodiment has been described with respect to the case where the G4 facsimile communication and the G3 facsimile communication are executed by two B channels, according to the embodiment, both of the G4 facsimile communication and the telephone communication or both of the G3 facsimile communication and the telephone communication can be performed by using two B channels as controlled by the switching of the switches SWa and SWb.

Figure 6:
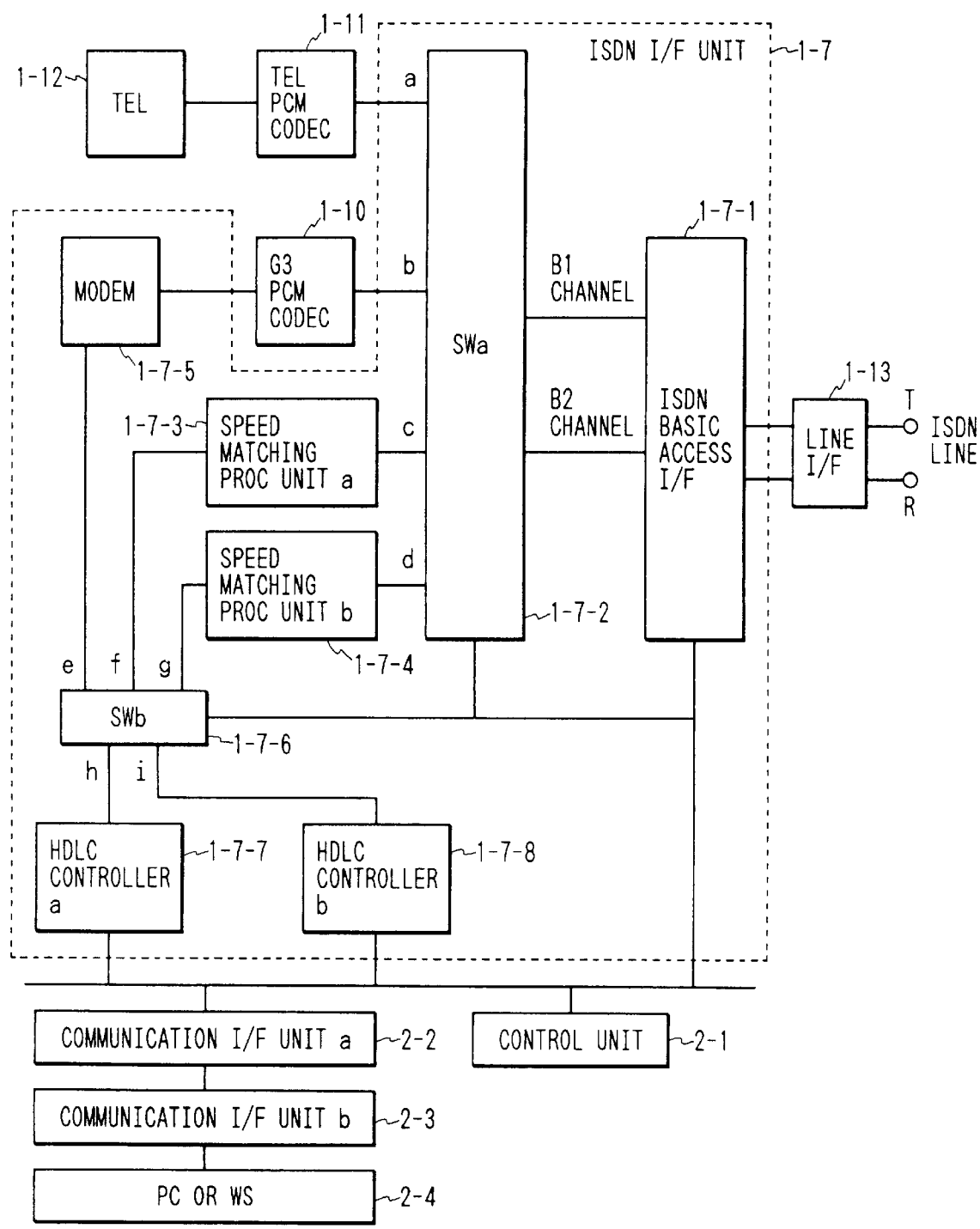
FIG. 6 is a block diagram showing a construction of a second embodiment of the invention in which a part of the construction of first embodiment of FIG. 1 is changed.

Although the above embodiment has been described with respect to the case of the facsimile apparatus for communicating image information as a data communication, in the invention, a computer apparatus which can communicate code data can be also connected. An embodiment in this case will now be described with reference to FIG. 6. In FIG. 6, the same component elements as those in FIG. 1 are designated by the same reference numerals.

Reference numeral 2-1 denotes a control unit as a microcomputer circuit comprising a CPU, an ROM, an RAM, a clock IC, an I/O, a CGROM, and the like. The control unit 2-1 controls the operation of a whole apparatus and manages various kinds of data by a software control of the microcomputer. Reference numerals 2-2 and 2-3 denote serial or parallel communication I/F units for controlling the communication interface such as RS232C, SCSI, or the like. Reference numeral 2-4 denotes a computer terminal of a personal computer, a work station, or the like.

Reference numeral 1-7 denotes the ISDN I/F unit comprising: the ISDN basic access I/F 1-7-1; the B-channel change-over switch SWa 1-7-2; the speed matching proc unit a 1-7-3; the speed matching proc unit b 1-7-4; the MODEM 1-7-5; the B-channel change-over switch SWb 1-7-6; an HDLC controller 1-7-7; and an HDLC controller b 1-7-8. The ISDN I/F unit 1-7 surrounded by a broken line is constructed by a one-chip IC. The ISDN basic access I/F unit 1-7-1 mainly controlled by the ISDN layers 1 and 2. The B-channel change-over switch SWa 1-7-2 performs the function to switch the data paths in accordance with the classification of the information of the B-channel data which is transmitted or received as shown in FIG. 6. There are the following three kinds of data classifications: 64k non-limit digital information; 3.1K audio; and audio. The speed matching proc units a 1-7-3 and b 1-7-4 process the conversion of the data transfer rate such as conversion of 64 kbps/56 kbps or the like. The MODEM 1-7-5 executes the modulation of the data which is transmitted, the demodulation of the received data, and the like. The B-channel change-over switch SWb 1-7-6 selects two data paths from three data paths of the MODEM and the speed matching proc units a and b and inputs/outputs the data. The HDLC controller a 1-7-7 executes a process such as framing of the B-channel data which is transmitted, deframing of the received B-channel data, or the like. The HDLC controller b 1-7-8 executes a process such as framing of the B-channel data which is transmitted, deframing of the received B-channel data, or the like. The G3-PCM-CODEC 1-10 and the TEL-PCM-CODEC 1-11 converts digital data into analog data upon reception and converts analog data into digital data upon transmission in accordance with their characteristics. Reference numeral 1-12 denotes the telephone circuit which is used in speech communication. Reference numeral 1-13 denotes the line I/F comprising a pulse transformer or the like. The B-channel data and the D-channel data are transmitted or received through the line I/F 1-13.

In the above construction, a computer terminal 2-4 transmits or receives data to/from the control unit 2-1 through the communication I/F unit b 2-3 and the communication I/F unit a 2-2. The data generated from the computer terminal 2-4 is transmitted by the ISDN I/F unit 1-7. The data received by the ISDN I/F unit 1-7 is transmitted to the computer terminal 2-4.

According to the first embodiment of the invention as mentioned above, in the communication apparatus which is connected to the ISDN, at least the ISDN I/F unit for separating the B-channel data and the D-channel data and for inputting/outputting, the means for switching the data paths in accordance with the classification of the information of the B-channel data and inputting/outputting, the means for matching the speed to the path for the 64k non-limit digital data in the path of the B-channel data, and the MODEM are formed on one chip, so that the number of parts which are essential in the ISDN communication terminal are reduced, the scale of hardware can be extremely decreased, and the costs can be also reduced.

In the path of the B channels, by possessing the paths for the 64k non-limit digital data for two channels, a number of kinds of digital communication can be realized by the multiaccess.

Further, in addition to the component elements formed on one chip mentioned above, the means for selecting the separate data paths in accordance with the classification of the information of the B-channel data and the means for controlling the HDLC of the selected B-channel data path are built in the one-chip IC. The serial or parallel communication I/F is connected to the one-chip IC, so that the personal computer, work station, or the like can be easily connected to the ISDN line. Therefore, a stand-alone terminal can be developed into a multiaccess terminal of the multimedia and ISDN line with low costs and small installation area.

(Second embodiment)

An ISDN communication terminal device in which the telephone function can be made operative by only the power supply from the network without using any backup power source even in case of a power failure will now be described as a second embodiment.

The second embodiment of the invention will now be described in detail hereinbelow with reference to the drawings.

Figure 7:
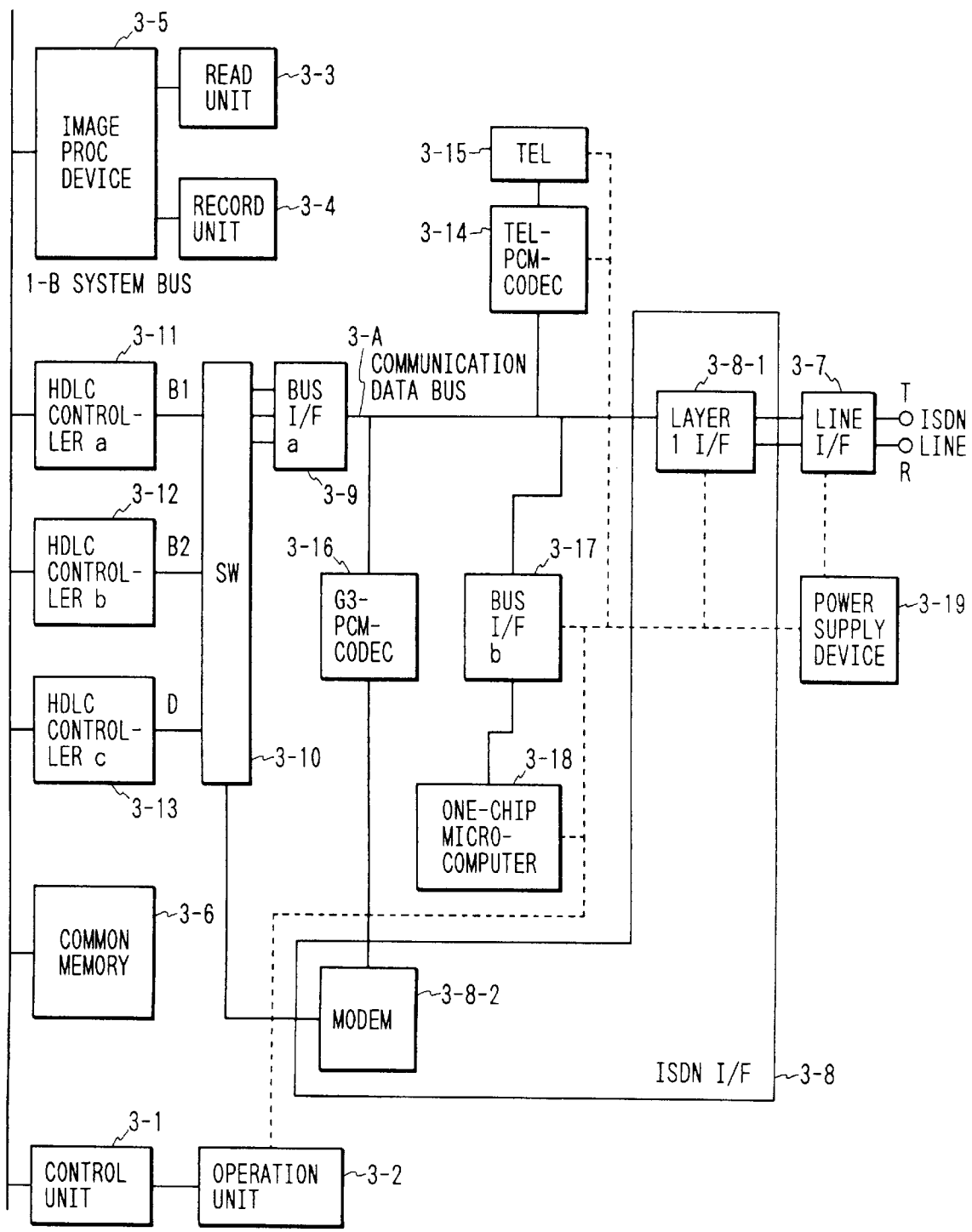
FIG. 7 is a block diagram showing a construction of a communication apparatus of the second embodiment.

An outline of a construction of the second embodiment will be first explained with reference to the block diagram of FIG. 7.

Reference numeral 3-1 denotes a control unit such as a microcomputer circuit comprising a CPU, a ROM, a RAM, a clock IC, an I/O, a CGROM, and the like. The control unit 3-1 controls the operation of the entire apparatus and manages various kinds of data by software control of the microcomputer. Reference numeral 3-2 denotes an operation unit such as a terminal comprising various kinds of keys, a display unit, and the like. The operation unit 3-2 accepts a key input from an operator and displays various information. Reference numeral 3-3 denotes a read unit comprising a CCD, an A/D converter, an image processor, and the like. The read unit 3-3 executes image processes such as photoelectric conversion, A/D conversion, image correction, a binarizing process, and the like to the data which is optically read out. Reference numeral 3-4 denotes a record unit as an image output device such as a thermal printer, laser beam printer, ink jet printer, or the like. The record unit 3-4 generates as a visible image the image data read out by the read unit 3-3, the received image data, or the image data formed by the control unit. Reference numeral 3-5 denotes an image proc (processing) device comprising a compression code encoding/decoding processing circuit, an image data enlarging or reducing circuit, and the like. The image proc device 3-5 executes image processes such as encoding of the read image data, decoding of the received image data, generation of the decoded data, and the like. Reference numeral 3-6 denotes a common memory to store the read image data, the received image data, and the like. Reference numeral 3-7 denotes an ISDN line I/F comprising a pulse transformer or the like.

Reference numeral 3-8 denotes an ISDN I/F unit comprising a layer 1 I/F (interface) 3-8-1 and an MODEM 3-8-2. The ISDN I/F unit 3-8 is constructed by a one-chip IC.

The layer 1 I/F 3-8-1 controls the ISDN layer 1 and inputs/outputs the B-channel data, D-channel data, and the like through a communication data bus 3-A. The B-channel data which is transmitted or received has the following three kinds of information classifications: "non-limit digital information"; 3.1K audio; and audio. The MODEM 3-8-2 executes the modulation of the data which is transmitted, the demodulation of the received data, and the like. Reference numeral 3-9 denotes a bus I/F a for constructing or dissolving the B-channel data and D-channel data which are transmitted or received through the communication data bus 3-A. Reference numeral 3-10 denotes a change-over switch SW for setting data paths of the dissolved B-channel data and D-channel data. HDLC controllers 3-11, 3-12, and 3-13 execute processes such as framing of the D-channel data and B-channel data which are transmitted, deframing of the received D-channel data and B-channel data, and the like. G3-PCM-CODEC 3-16 and TEL-PCM-CODEC 3-14 converts digital data into analog data upon reception and converts analog data into digital data upon transmission on the basis of their characteristics (CCITT Recommendation G.711), respectively. A telephone circuit 3-15 is used for speech communication. Reference numeral 3-17 denotes a bus I/F b for constructing or dissolving the D-channel data which is transmitted or received through the communication data bus 3-A. Reference numeral 3-18 denotes a one-chip microcomputer for controlling the ISDN layers 2 and 3. However, the one-chip microcomputer 3-18 executes the operation such as a layer control or the like only in case of a power failure.

A power supply device 3-19 comprises: a power supply circuit for converting a voltage of 40 V (about 400 mV) which is sent from the ISDN line by a phantom power supply of four wires into a voltage of 5 V by a switching regulator or the like and supplying an electric power to each circuit which is necessary in case of power failure; and a power supervisory circuit. The power supply device 3-19 switches the commercial power source and the power supply from the line by the control of the power supervisory circuit.

Figure 8:
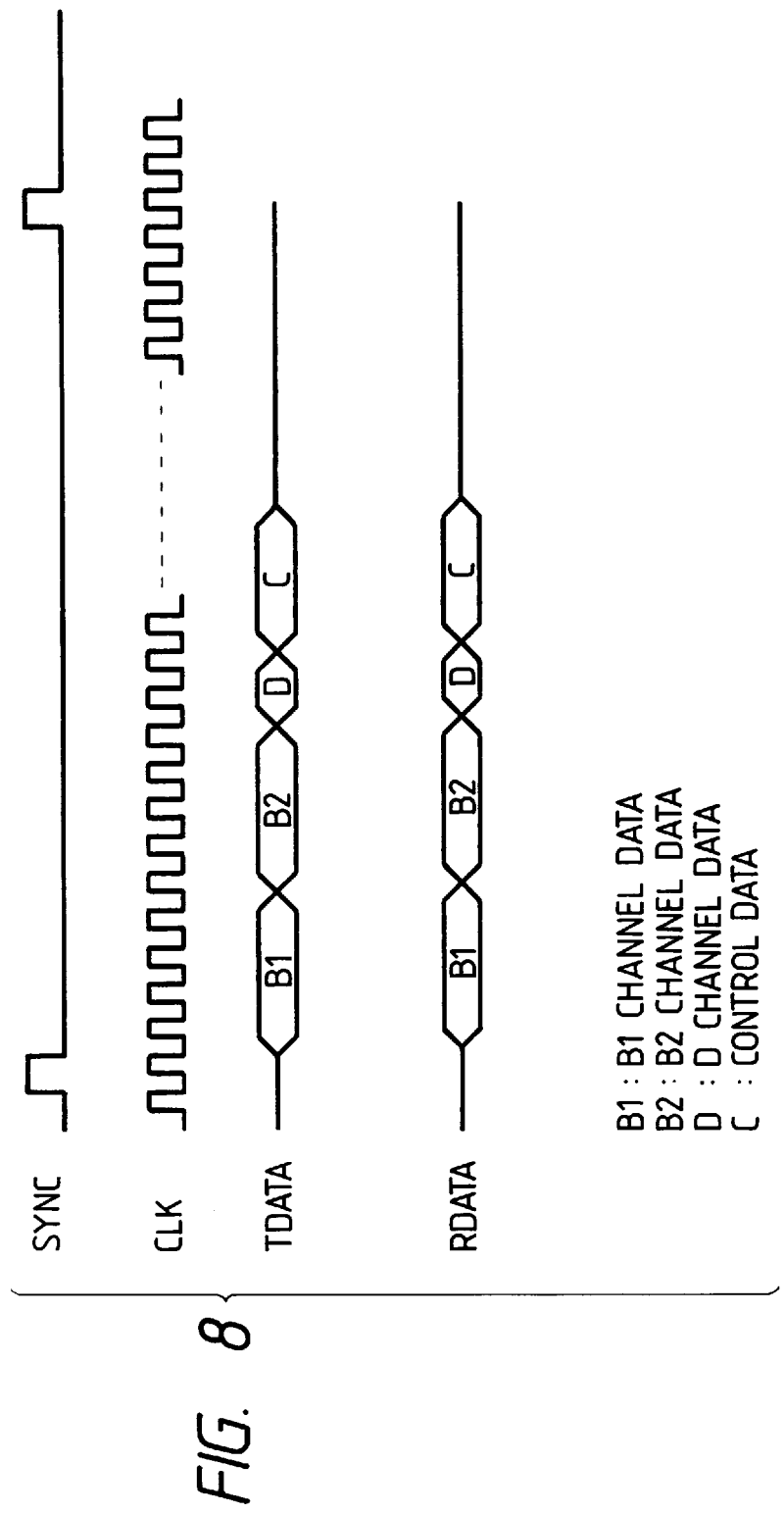
FIG. 8 is a diagram showing a data format.

The communication data bus 3-A will now be described with reference to FIG. 8. For example, as shown in FIG. 8, the data flowing on the communication data bus 3-A comprises: a sync signal (SYNC); a data clock (CLK); transmission data (TDATA); and reception data (RDATA). The transmission data and reception data are transmitted or received with the sync signal in accordance with a format as shown in the diagram. The apparatus which is connected to the communication data bus 3-A dissolves or constructs such a format by using the sync signal and clock.

A communication control procedure which is executed by the facsimile apparatus in the second embodiment is the same as that shown in FIG. 3. The SET UP message shown in FIG. 3 has the same content as that shown in FIG. 4. The information transfer ability indicative of the ability of the terminal of the information which is transmitted or received by the SET UP message is also the same as that shown in FIG. 5. Therefore, the descriptions related to FIGS. 3 to 5 are not repeated here.

Figure 9:
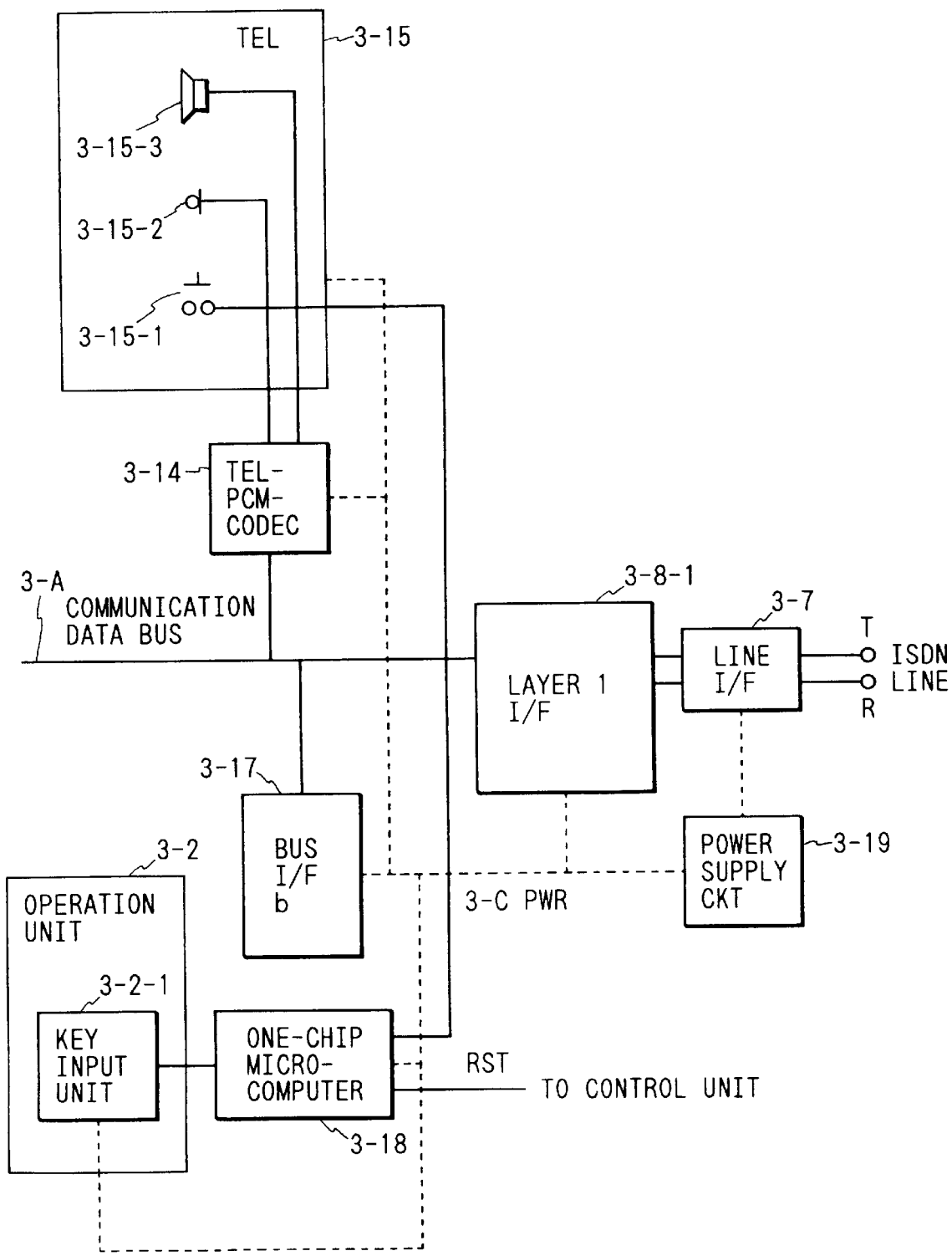
FIG. 9 is a block diagram showing a construction which is used in speech communication control in case of a power failure.
Figure 10:
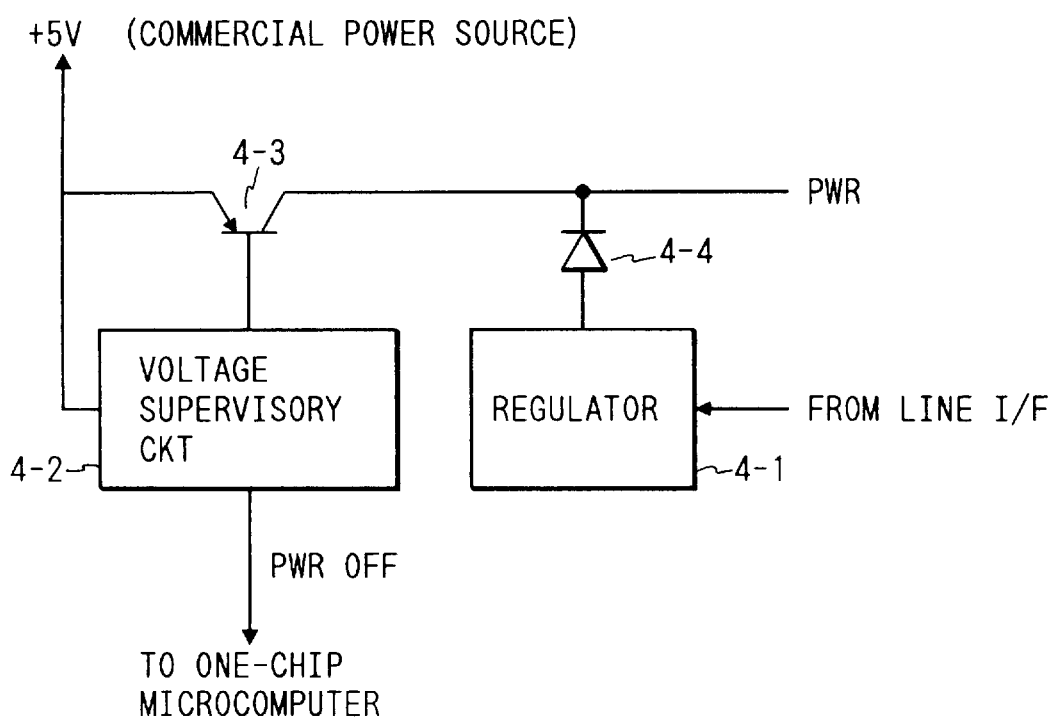
FIG. 10 is a diagram showing a construction of a power supply device.
Figure 11:
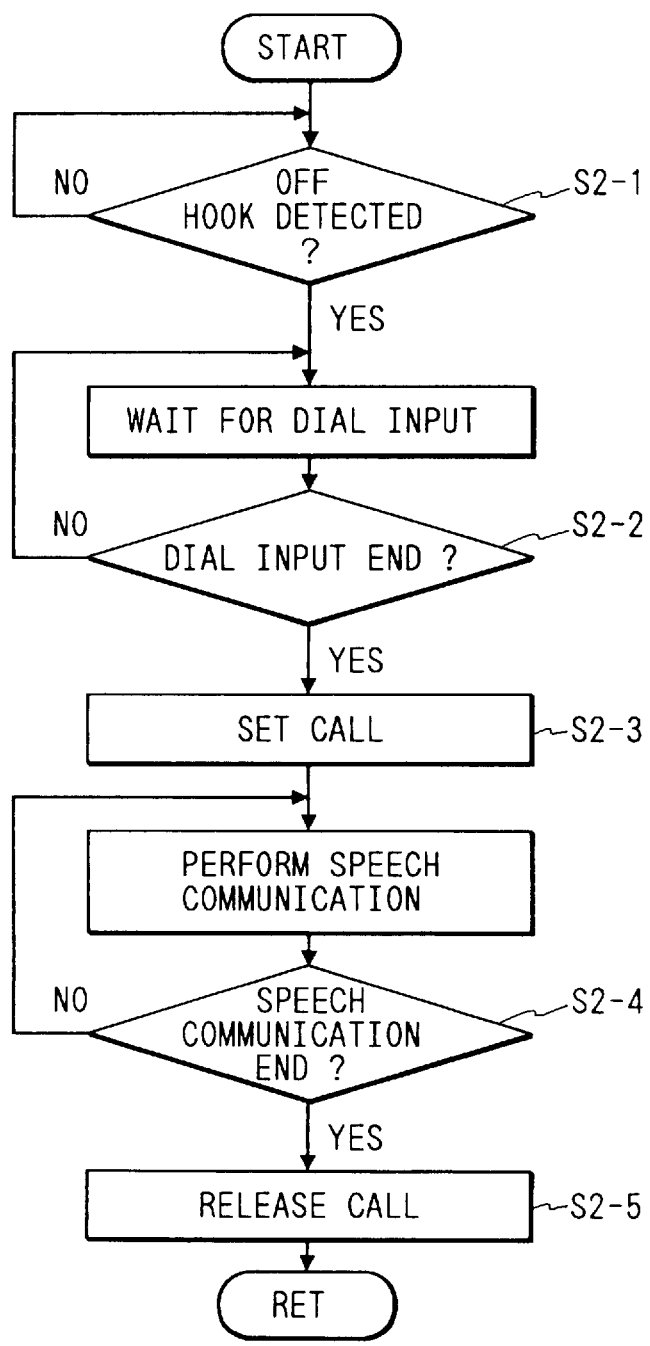
FIG. 11 is a flowchart showing the control of the speech communicating operation.

The speech communicating operation in case of a power failure will now be described with reference to FIG. 9 showing a block diagram of the circuits which are necessary for the speech communication control in case of power failure, FIG. 10 showing the power supply device in detail, and FIG. 11 showing a flowchart. FIG. 9 shows the circuits which are connected to the wirings shown by broken lines in FIG. 7.

Reference numeral 3-15 denotes a telephone handset to convert the audio data into an audio signal; 3-15-1 a hook switch to detect an off-hook state; 3-15-2 a microphone; 3-15-3 a speaker; 3-2 an operation unit for a user to execute an operation; 3-2-1 a key input unit; 3-19 a power supply device; and 3-14 a codec for a telephone (TEL-PCM-CODEC) having a function such as an adjustment of the level of the audio signal from the handset or the like. Reference numeral 3-18 denotes the one-chip microcomputer for performing the detection of the off-hook state of the handset 3-15 in case of power failure, the control of the ISDN layer 1 I/F 3-8-1, the control of the TEL-PCM-CODEC 3-14, the control of high-order layers 2 and 3 the control of the acception of a key input from the operation unit 3-2, and the like.

An outline of an electric power consumption of the circuit will now be explained. Each of the TEL-PCM-CODEC 3-14, layer 1 I/F 3-8-1, and 1-chip microcomputer 3-18 has an electric power consumption of about 100 mW or less. Each of the other sections is set to about tens of a mW. An electric power consumption of the entire circuit is set to about 300 mW, so that it lies within a range in which the apparatus can operate from a power source (about 400 mW) which is supplied from the line. The MODEM 3-8-2 solely consumes an electric power of about 300 mW. The control unit 3-1 requires a large electric power consumption of about a few W. Therefore, the MODEM and the control unit cannot be operated by the power source which is supplied from the line.

In the embodiment, accordingly, the telephone conversation communication can be performed under control of the 1-chip microcomputer 3-18 which can operate from a low electric power in case of power failure.

An example of the power supply device will now be described in detail with reference to FIG. 10. Reference numeral 4-1 denotes a regulator; 4-2 a voltage supervisory circuit; 4-3 a transistor; and 4-4 a diode. When a power failure occurs, by using the above circuit construction, the power failure is detected by the voltage supervisory circuit 4-2 and the power supply is switched from the commercial power source to the power supply from the line (output of the regulator 4-1) by the control of the transistor 4-3 and diode 4-4. The regulator converts the voltage of about 40 V which is supplied from the line into a voltage of 5 V and supplies the power source. The voltage supervisory circuit 4-2 relates the occurrence of the power failure to the 1-chip microcomputer 3-18.

An example of the speech communication control in case of power failure will now be described with reference to the flowchart of FIG. 11. Such a control is executed by the 1-chip microcomputer 3-18.

First, by picking up the handset, the hook switch is set into the off-hook state. The 1-chip microcomputer detects the off hook (S2-1) and waits for a dial input from the key input unit 3-2-1 (S2-2). When there is a dial input from the key input unit 3-2-1, the layers 1, 2, and 3 are controlled by the ISDN layer 1 I/F 3-8-1 and the 1-chip microcomputer 3-18 and a call is set, so that the speech communication can be performed. The call setting in step S2-3 is executed in accordance with a procedure as shown in FIG. 2. After the call is set, an audio communication (speech communication) can be performed through the communication data bus 3-A. After completion of the speech communication (S3-4), the call is released (S3-5) in accordance with a procedure as shown in FIG. 3.

In the case where the power failure is recovered during the call connection and the power supply mode is switched from the line to the commercial power source, a signal indicative of a state in speech communication is generated from the 1-chip microcomputer to the control unit 3-1 and, for example, the CPU in the control unit 3-1 is reset (an RST signal in FIG. 9 is generated), so that it is possible to avoid collision of the data of the 1-chip microcomputer 3-18 and the D-channel data of the control unit 1-1.

The third embodiment of the invention will now be described.

Figure 12:
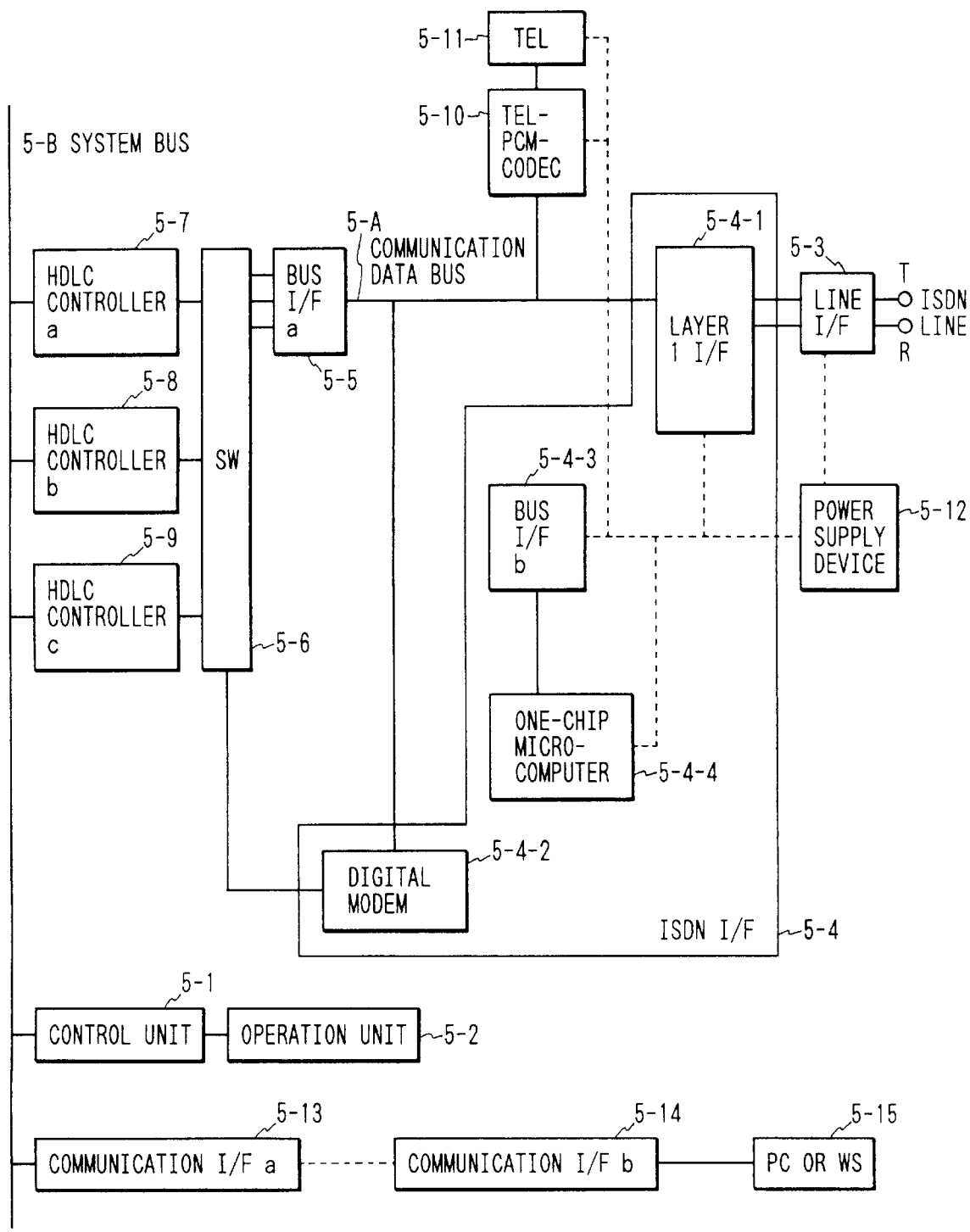
FIG. 12 is a block diagram showing a construction of a third embodiment of the invention.

An outline of the construction will now be described with reference to a block diagram of FIG. 12.

Reference numeral 5-1 denotes a control unit such as a microcomputer circuit comprising, a CPU, a ROM, a RAM, a clock IC, an I/O, a CGROM, and the like. The control unit 5-1 controls the operation of the entire apparatus and manages various kinds of data by software control of the microcomputer.

Reference numeral 5-3 denotes an ISDN line I/F comprising a pulse transformer or the like; and 5-4 indicates an ISDN I/F comprising: a layer 1 I/F 5-4-1; a digital MODEM 5-4-2; a bus I/F b 5-4-3; and a one-chip microcomputer 5-4-4. The ISDN I/F 5-4 is constructed one a one-chip IC.

The ISDN layer 1 I/F 5-4-1 controls the ISDN layer 1 and inputs/outputs the B-channel data and D-channel data and the like through a communication data bus 5-A. The B-channel data which is transmitted or received has the following three kinds of information classifications: one-limit digital information; 3.1K audio; and audio. The digital MODEM 5-4-2 executes the modulation of the data which is transmitted, the encoding into a PCM signal, the decoding and demodulation of the PCM signal of the received data, and the like.

Reference numeral 5-4-3 denotes the bus I/F b for constructing or dissolving the D-channel data which is transmitted or received through the communication data bus 5-A. The 1-chip microcomputer 5-4-4 controls the ISDN layers 2 and 3. However, the 1-chip microcomputer executes the operation such as a layer control or the like only in case of a power failure.

Reference numeral 5-5 denotes a bus I/F a for constructing or dissolving the B-channel data and D-channel data which is transmitted or received through the communication data bus 5-A. Reference numeral 5-6 denotes a change-over switch SW for setting data paths of the dissolved B-channel data and the D-channel data. HDLC controllers 5-7, 5-8 and 5-9 execute processes such as framing of the D-channel data and B-channel data which are transmitted, deframing of the D-channel data and B-channel data received, and the like. A TEL-PCM-CODEC 5-10 converts the digital data into the analog data upon reception and converts the analog data into the digital data upon transmission on the basis of its characteristics (CCITT Recommendation G.711). A telephone circuit 5-11 is used for speech communication.

Reference numeral 5-12 denotes a power supply device comprising: a power supply circuit for converting a voltage of 40 V (about 400 mW) which is sent from the ISDN line by the phantom power supply of four wires into a voltage of 5 V by a switching regulator or the like, thereby supplying an electric power to each circuit which is necessary in case of power failure; and a lower supervisory circuit. The power supply device 5-12 switches the commercial power source and the power supply from the line by the control of the power supervisory circuit.

Reference numerals 5-13 and 5-14 denote serial or parallel communication interfaces for controlling the communication interface of, for example, RS232C, SCSI, or the like. Reference numeral 5-15 indicates a computer terminal of a personal computer, a work station, or the like.

In the above construction, the computer terminal 5-15 transmits or receives data to/from the control unit 5-1 through the communication I/F b 5-14 and the communication I/F a 5-13. The data received from the computer terminal 5-15 is transmitted by the ISDN I/F 5-4. The data received by the ISDN I/F 5-4 is transmitted to the computer terminal 5-15. In case of power failure, the speech communication can be executed by the power supply from the line in a manner similar to the operation and control described in the second embodiment. In the third embodiment, in addition to the layer 1 I/F 5-4-1 and the MODEM 5-4-2, the bus I/F 5-4-3 and the 1-chip microcomputer 5-4-4 are also built in the one-chip IC. Therefore, the installation area can be further reduced.

The fourth embodiment of the invention will now be described. The fourth embodiment is realized by adding a construction for enabling a speech communication to be executed even in case of a power failure of the apparatus of the first embodiment.

An outline of a construction will be first explained with reference to a block diagram of FIG. 13.

Reference numeral 6-1 denotes a control unit such as a microcomputer circuit comprising a CPU, a ROM, a RAM, a clock IC, an I/O, a CGROM, and the like. The control unit 6-1 controls the operation of the entire apparatus and manages various kinds of data by software control of the microcomputer. Reference numeral 6-2 denotes an operation unit such as a terminal comprising various kinds of keys, a display unit, and the like. The operation unit 6-2 accepts a key input of an operator and displays various kinds of information. A read unit 6-3 comprises a CCD, an A/D converter, an image processor, and the like. The read unit 6-3 executes image processes such as photoelectric conversion, A/D conversion, image correction, a binarizing process, and the like to the data which is optically read out. A record unit 6-4 is an image output apparatus such as thermal printer, laser beam printer, ink jet printer, or the like for generating as a visible image the image data read by the read unit 6-3, the received image data, or the image data formed by the control unit. An image proc (processing) unit 6-5 comprises a compression code encoding/decoding processing circuit, an image data enlarging/reducing circuit, and the like and executes image processes such as encoding of the read image data, decoding of the received image data, generation of the decoded data, and the like. A common memory 6-6 stores the read image data, the received image data, and the like. Reference numeral 6-7 denotes an ISDN I/F unit which is constructed on a one-chip IC and comprises: an ISDN basic access I/F 6-7-1; a B-channel change-over switch SWa 6-7-2; a speed matching proc (processing) unit a 6-7-3; a speed matching proc unit 6-7-4; a MODEM 6-7-5; and a B-channel change-over switch SWb 6-7-6. The ISDN basic access I/F 6-7-1 mainly controls the ISDN layers 1 and 2. The B-channel change-over switch SWa 6-7-2 performs the function to switch the data path in accordance with the information classification of the B-channel data which is transmitted or received. There are the following three kinds of data classifications: non-limit digital information; 3.1K audio; and audio. The speed matching proc units a 6-7-3 and b 6-7-4 process the conversion of a data transfer rate such as a conversion of 64 kbps/56 kbps or the like. The MODEM 6-7-5 executes the modulation of the data which is transmitted, the demodulation of the received data, and the like. The B-channel change-over switch SWb 6-7-6 selects two data paths from three data paths of the MODEM and the speed matching proc units a and b and inputs/outputs the data. An HDLC controller a 6-8 executes processes such as framing of the B-channel data which is transmitted, deframing of the received B-channel data, and the like. An HDLC controller b 6-9 executes processes such as framing of the B-channel data which is transmitted, deframing of the received B-channel data, and the like. A G3-PCM-CODEC 6-10 and a TEL-PCM-CODEC 6-11 convert the digital data into the analog data upon reception and converts the analog data into the digital data upon transmission on the basis of their characteristics (CCITT Recommendation G.711), respectively. A telephone circuit 6-12 is used for speech communication. A line I/F 6-13 comprises a pulse transformer or the like. The B-channel data and D-channel data are transmitted or received through the line I/F 6-13. A power supply device 6-14 comprises: a power supply circuit for converting a voltage of 40 V (about 400 mW) which is sent from the ISDN line by the phantom power supply of four wires into a voltage of 5 V by a switching regulator or the like; and a power supervisory circuit. The power supply device 6-14 switches the commercial power source and the power supply from the line by the control of the power supervisory circuit. A one-chip microcomputer 6-15 mainly controls a part of the ISDN layer 2 and the layer 3. However, the one-chip microcomputer 6-15 executes the operation such as a layer control or the like only in case of a power failure.

In a manner similar to the first embodiment, upon reception, by detecting the information transfer ability in FIG. 4, the switching operations of the change-over switches SWa 6-7-2 and SWb 6-7-6, and upon transmission, the switching operations of the change-over switches SWa 6-7-2 and SWb 6-7-6 are controlled in accordance with the classification of the data to be transmitted. The information transfer ability in the SET UP message is also set and transmitted.

Figure 13:
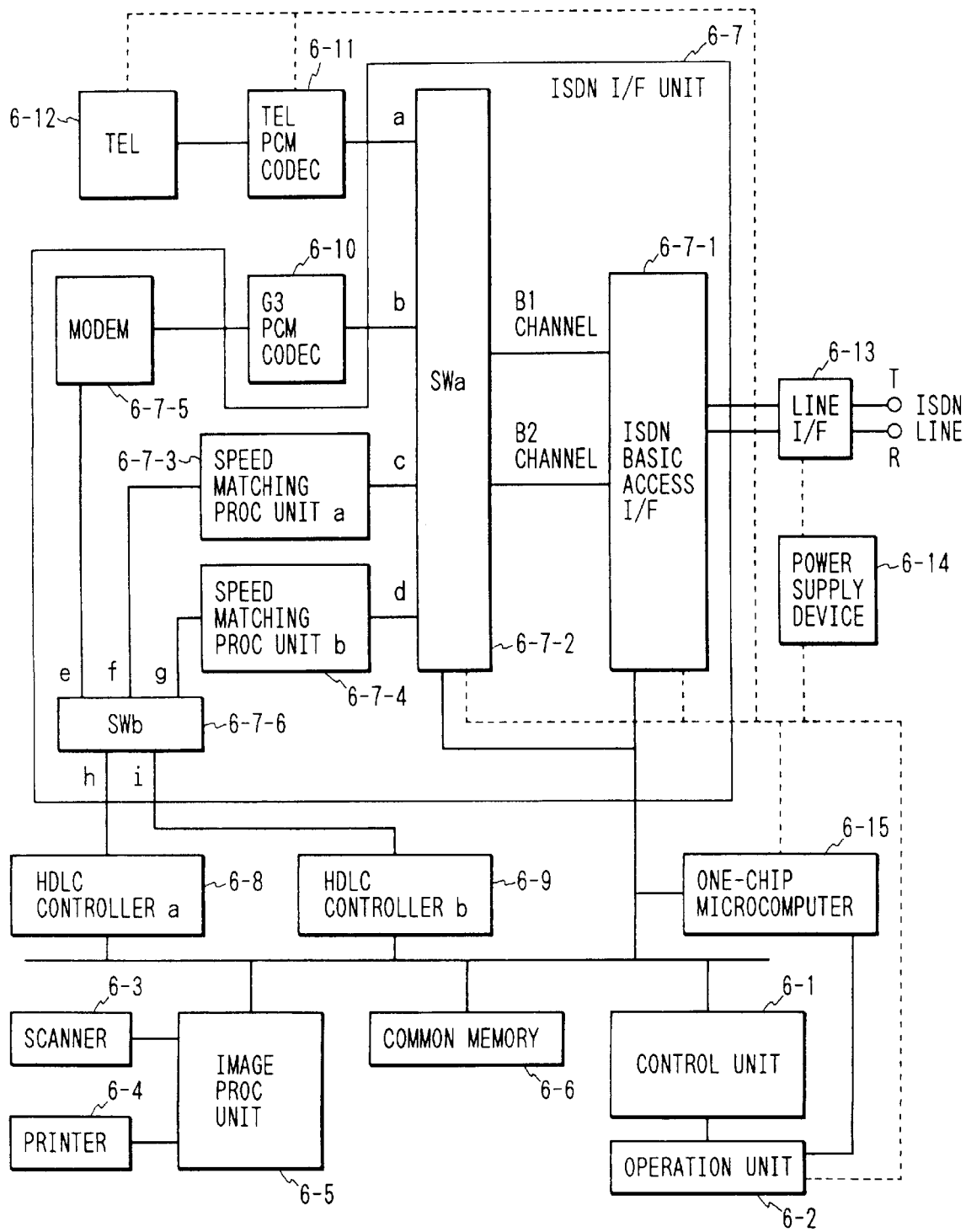
FIG. 13 is a block diagram showing a construction of a fourth embodiment of the invention.
Figure 14:
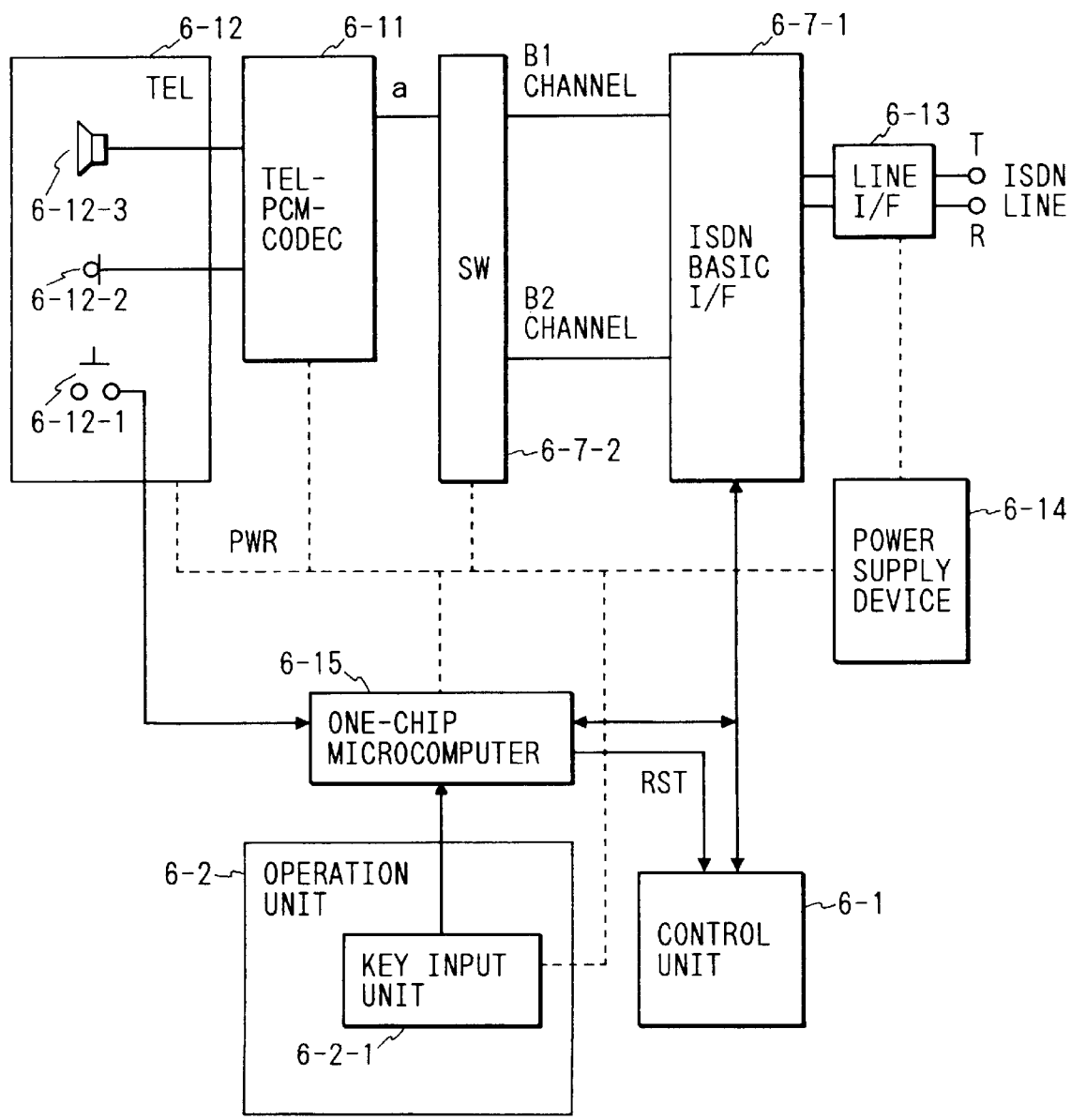
FIG. 14 is a block diagram showing a construction which is used in the speech communication control in case of a power failure in the fourth embodiment.

FIG. 14 shows the circuits which are connected to wirings shown by broken lines in FIG. 13. In the fourth embodiment, the power supply device and the flow are substantially the same as those in the second embodiment described in FIGS. 10 and 11.

Reference numeral 6-12 denotes a telephone handset for converting the audio data into the audio signal; 6-12-1 a hook switch to detect an off hook; 6-12-2 a microphone; 6-12-3 a speaker; 6-2 an operation unit for a user to execute the operation; 6-2-1 a key input unit; 6-14 a power supply device; and 6-11 a CODEC for telephone (TEL-PCM-CODEC) having functions for performing the A/D conversion and D/A conversion of the signal, the adjustment of a level of the audio signal which is derived from the handset, and the like. Reference numeral 6-15 denotes a one-chip microcomputer for executing the detection of off hook in case of power failure, the control of the ISDN basic I/F, control of the TEL-PCM-CODEC, control of the high-order layers 2 and 3, and control of the acception of a key input and the like. Reference numeral 6-7-2 denotes the B-channel change-over switch SWa for connecting the B1 channel or B2 channel with the data path (a) in case of power failure. The ISDN line I/F 6-13 comprises a pulse transformer or the like.

An outline of an electric power consumption in this circuit will now be described. Each of the TEL-PCM-CODEC 6-11, ISDN basic I/F, and 1-chip microcomputer has an electric power consumption of about 100 mW or less. Each of the other sections has an electric power consumption of about tens of mW. An electric power consumption of the whole circuit is equal to about 300 mW and lies within a range in which the apparatus can operate from the power source (about 400 mW) which is supplied from the line. The MODEM solely consumes an electric power of about 300 mW and the control unit requires a large electric power consumption of about a few W. Thus, the MODEM and the control unit cannot be made operative by the power source supplied from the line.

Since the power supply device in FIG. 10 has already been described before, its description is not repeated here.

However, the voltage supervisory circuit 4-2 informs the occurrence of the power failure to the 1-chip microcomputer 6-15.

Since the speech communication control in case of power failure is also substantially the same as that mentioned in FIG. 11, its description also is not repeated.

In the case where the power failure is recovered during the call connection and the power supply mode is switched from the line to the commercial power source, a signal indicative of a state in speech communication is generated from the 1-chip microcomputer to the control unit 6-1 and, for example, the CPU in the control unit 6-1 is reset (an RST signal in FIG. 14 is generated), so collision of it is possible to avoid that the data on the bus of the 1-chip microcomputer 6-15 and the control unit 6-1. Although not shown, a buffer is interposed between the control unit and the ISDN I/F unit 6-7 and the buffer is disabled by a signal indicative of a state in speech communication in the case where the speech communication is being executed by the 1-chip microcomputer. With this construction, it is also possible to avoid collision of the data on the bus of the 1-chip microcomputer 6-15 and the control unit 6-1.

Figure 15:
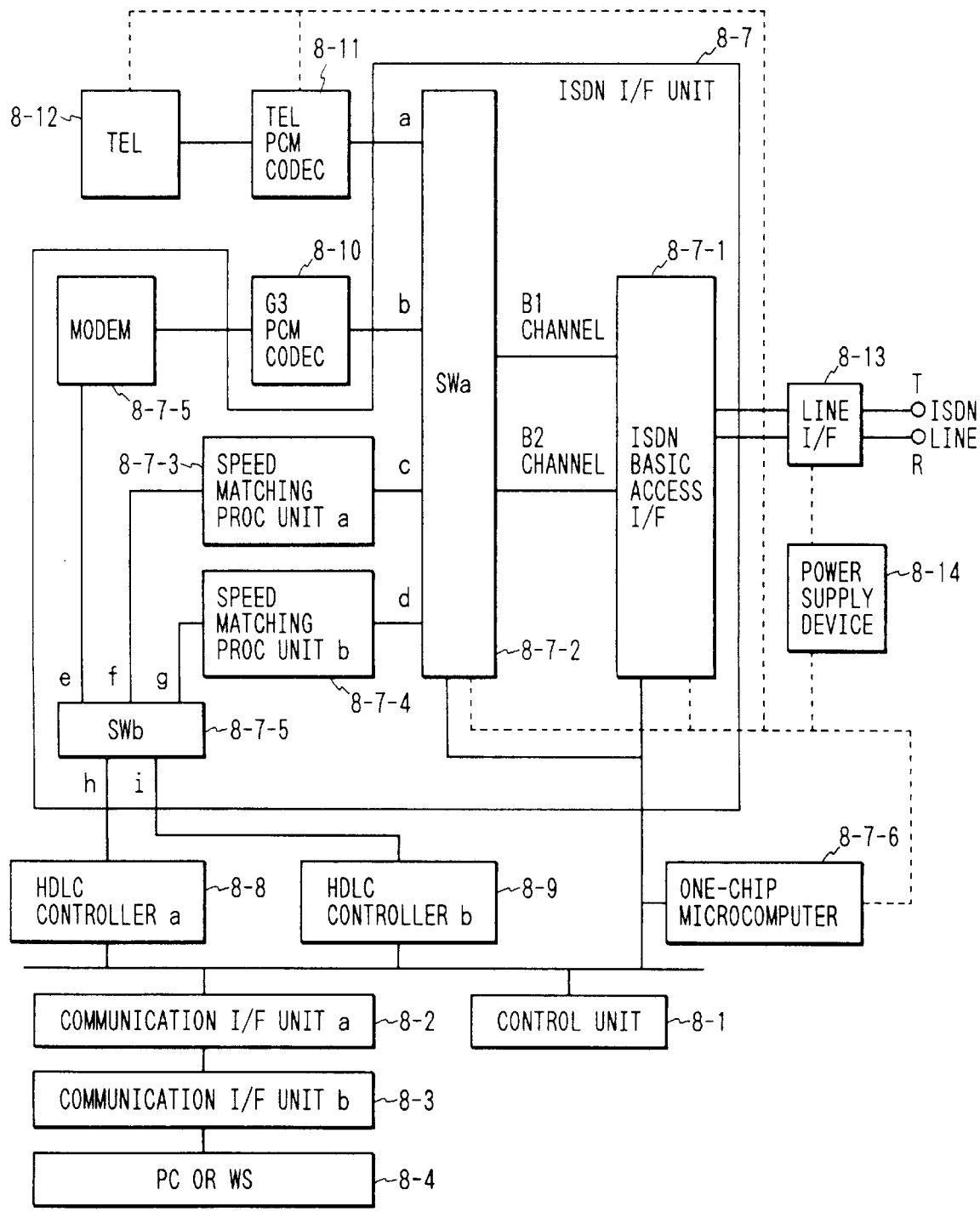
FIG. 15 is a block diagram showing a construction of an apparatus in which a part of the fourth embodiment is changed.

Although the above fourth embodiment has been described with respect to facsimile apparatus as an example, the invention can be also used in a computer terminal. A construction in this case is shown in FIG. 15.

As described above, in the communication apparatus which is connected to the ISDN, at least the ISDN I/F unit for inputting/outputting the data on the bus on which the B-channel data and the D-channel data are multiplexed and the MODEM are formed on one chip. In this one chip, a power supply to the ISDN I/F unit and power supplies to the other sections are separated. In case of power failure, a power source is supplied from the line to the ISDN I/F unit. Thus, the electric power consumption which is required for the telephone function can be reduced and the speech communication can be executed by only the station power supply from the line. Since the 1-chip microcomputer for mainly controlling the layers 2 and 3 in case of power failure is also built in the chip, the number of parts can be reduced, the scale of hardware can be extremely reduced, and the cost can be also decreased.

By connecting the serial or parallel communication interface, a personal computer, a work station, or the like can be also easily connected to the ISDN line. Therefore, a stand-alone terminal can be developed to a multiaccess terminal of the multimedia and ISDN line with low costs and a small installation area.

According to the invention as mentioned above, the construction of the communication apparatus can be simplified and even in case of the occurrence of a power failure, the telephone function can be made operative by the power supply from the network without using a backup power source.

According to the invention, further, a wide digital communication such as not only the facsimile communication but also the personal computer communication or the like can be realized.

Although the present invention has been described with respect to the preferred embodiments, the invention is not limited to the foregoing embodiments but many modifications and variations are possible within the sprit and scope of the appended claims of the invention.

What is claimed is:

1. A communication apparatus which is connected to a digital line, comprising:

a digital line interface for inputting/outputting data on a bus of the digital line in which information channel data and control channel data are multiplexed;

data communication means for performing data communication;

voice communication means for performing voice communication;

first control means, operable by first electrical power, which controls by using the first electrical power, when the first electrical power can be supplied, said data communication means and said voice communication means; and second control means, having a power consumption less than that of said first control means and operable by second electrical power, wherein the second electrical power is less than the first electrical power and is supplied from the digital line, wherein said second control means is not used when the first electrical power can be supplied, and does not control said data communication means but does control said voice communication means when the first electrical power cannot be supplied.

2. An apparatus according to claim 1, wherein the first electrical power is supplied from a commercial power source.

3. An apparatus according to claim 1, wherein the case when the first electrical power cannot be supplied is due to power failure.

4. An apparatus according to claim 1, wherein said data communication means has a modem for modulating/demodulating the data, and said digital line interface and said modem are constructed by a one-chip microcomputer.

5. An apparatus according to claim 1, wherein the digital line is an integrated services digital network (ISDN).

6. A communication apparatus which can be connected to a digital line in which a control channel, a first information channel and a second information channel are multiplexed, comprising:

input/output means for inputting/outputting data to be communicated through the digital line;

a digital line interface for inputting/outputting the data on a bus of the digital line, and for switching multiplexed first information channel data to a first communication path and multiplexed second information channel data to a second communication path; and a modem for modulating/demodulating the data communicated through the digital line, wherein said digital line interface and said modem are constructed as a one-chip IC, the data from the digital line is input to said input/output means through said one-chip IC, and the data from said input/output means is transmitted to the digital line through said one-chip IC.

7. An apparatus according to claim 6, wherein said one-chip IC has switching means for switching the first communication path for performing a communication through said modem and the second communication path for performing a communication not through the modem.

8. An apparatus according to claim 7, wherein the first communication path is a communication path for performing G3 facsimile communication, and the second communication path is a communication path for performing G4 facsimile communication.

9. An apparatus according to claim 6, further comprising conversion means for converting an analog signal from said modem into a digital signal to output the converted signal to said digital line interface, and for converting the digital signal from said digital line interface into the analog signal to output the converted signal to said modem.

10. An apparatus according to claim 9, wherein said conversion means is used when G3 facsimile communication is performed.

11. An apparatus according to claim 6, wherein the digital line is an integrated services digital network (ISDN).

12. A communication apparatus which is connected to a digital line, comprising:

input/output means for inputting/outputting data to be communicated through the digital line;

a digital line interface for inputting/outputting the data on a bus of the digital line in which information channel data and control channel data are multiplexed;

a modem for modulating/demodulating the data communicated through the digital line;

voice communication means for performing voice communication;

first control means, operable by first electrical power, which controls by using the first electrical power, when the first electrical power can be supplied, at least said modem and said voice communication means; and second control means, having a power consumption less than that of said first control means and operable by second electrical power, wherein the second electrical power is less than the first electrical power and is supplied from the digital line, wherein said second control means is not used when the first electrical power can be supplied, and does not control said modem but does control said voice communication means when the first electrical power cannot be supplied, wherein said digital line interface and said modem are constructed as a one-chip IC, the data from the digital line is input to said input/output means through said one-chip IC, and the data from said input/output means is transmitted to the digital line through said one-chip IC.

13. An apparatus according to claim 12, wherein said one-chip IC has switching means for switching a first communication path for performing communication through said modem and a second communication path for performing a communication not through said modem.

14. An apparatus according to claims 13, wherein the first communication path is a communication path for performing G3 facsimile communication, and the second communication path is a communication path for performing G4 facsimile communication.

15. An apparatus according to claim 13, wherein said one-chip IC contains speed coincidence means for changing data transfer rate of the data communicated through the digital line, and the first communication path is for performing the communication through said modem and the digital line, but not through said speed coincidence means, and the second communication path is for performing the communication through said speed coincidence means and the digital line, but not through said modem.

16. An apparatus according to claim 12, further comprising conversion means for converting an analog signal from said modem into a digital signal to output the converted signal to said digital line interface, and for converting the digital signal from said digital line interface into the analog signal to output the converted signal to said modem.

17. An apparatus according to claim 16, wherein said conversion means is used when G3 facsimile communication is performed.

18. An apparatus according to claim 12, wherein the digital line is integrated services digital network (ISDN).

19. A communication apparatus which can be connected to a digital line, comprising:

input/output means for inputting/outputting data to be communicated through the digital line;

a digital line interface for inputting/outputting the data on a bus of the digital line in which information channel data and control channel data are multiplexed; and a modem for modulating/demodulating the data communicated through the digital line, wherein said digital line interface and said modem are constructed as a one-chip IC, the data from the digital line is input to said input/output means through said one-chip IC, and the data from said input/output means is transmitted to the digital line through said one-chip IC, wherein said one-chip IC has switching means for switching a first communication path for performing a communication through said modem and a second communication path for performing a communication not through the modem and said one-chip IC contains speed coincidence means for changing data transfer rate of the data communicated through the digital line, and wherein the first communication path is for performing the communication through said modem and the digital line, but not through said speed coincidence means, and the second communication path is for performing the communication through said speed coincidence means and the digital line, but not through said modem.

20. A communication apparatus which can be connected to a digital line, comprising:

input/output means for inputting/outputting data to be communicated through the digital line;

a digital line interface for inputting/outputting the data on a bus of the digital line in which information channel data and control channel data are multiplexed;

a modem for modulating/demodulating the data communicated through the digital line;

voice communication means for performing voice communication;

first control means, operable by first electrical power, which controls by using the first electrical power, when the first electrical power can be supplied, at least said modem and said voice communication means; and second control means, having a power consumption less than that of said first control means and operable by second electrical power, wherein the second electrical power is less than the first electrical power and is supplied from the digital line, wherein said second control means is not used when the first electrical power can be supplied, and does not control said modem but does control said voice communication means when the first electrical power cannot be supplied, wherein said digital line interface and said modem are constructed as a one-chip IC, the data from the digital line is input to said input/output means through said one-chip IC, and the data from said input/output means is transmitted to the digital line through said one-chip IC, and wherein said one-chip IC has switching means for switching a first communication path for performing a communication through said modem and a second communication path for performing a communication not through the modem.

21. An apparatus according to claim 20, wherein the first electrical power is supplied from a commercial power source.

22. An apparatus according to claim 20, wherein the case when the first electrical power cannot be supplied is due to power failure.

23. A method for controlling a communication apparatus which can be connected to a digital line, said method comprising:

an input/output step of inputting/outputting data on a bus of the digital line in which information channel data and control channel data are multiplexed;

a data communication step of performing data communication;

voice communication step of performing voice communication;

a first control step of enabling the data communication and the voice communication by a first control means, operable by first electrical power, which controls by using the first electrical power, when the first electrical power can be supplied, said data communication step and said voice communication step; and a second control step of enabling the voice communication by a second control means having a power consumption less than that of the first control means and operable by second electrical power, the second electrical power being less than the first electrical power and supplied from the digital line, wherein said second control means is not used when the first electrical power can be supplied, and does not control said data communication step but controls said voice communication step when the first electrical power cannot be supplied.

24. A method according to claim 23, wherein the first electrical power is supplied from a commercial power source.

25. A method according to claim 23, wherein the case when the first electrical power cannot be supplied is due to power failure.

26. A method according to claim 23, wherein said data communication step performs the data communication by controlling a data means comprising a digital line interface for inputting/outputting the data on the bus of the digital line in which the information channel data and the control channel data are multiplexed, and a modem for modulating/demodulating the data, the digital line and the modem being constructed of a one-chip microcomputer.

27. A method according to claim 23, wherein the digital line is an integrated services digital network (ISDN).

28. A communication apparatus which can be connected to a digital line, comprising:

connection means for connecting one of either first or second communication means to the digital line in which information channel data and control channel data are multiplexed;

first control means, operable by first electrical power, which controls by using the first electrical power, when the first electrical power is supplied, said connecting means such that either one of said first and second communication means performs communication through the digital line; and second control means, having a power consumption less than that of said first control means and operable by second electrical power, wherein the second electrical power is less than the first electrical power and is supplied from the digital line, wherein said second control means is not used when the first electrical power is supplied, for controlling said connection means such that said first communication means performs communication through the digital line, wherein said second communication means does not perform communication when the first electrical power is not supplied.

29. A communication apparatus according to claim 28, wherein the first electrical power is supplied from a commercial power source.

30. A communication apparatus according to claim 28, wherein the case of when the first electrical power is not supplied is due to a power failure.

31. A communication apparatus according to claim 28, wherein said second communication means has a modem for modulating/demodulating the data, and said connection means and said modem are constructed by a one-chip microcomputer.

32. A communication apparatus according to claim 28, wherein the digital line is an integrated services digital network (ISDN).

* * * * *